(12) United States Patent
Rao

(10) Patent No.: US 7,498,710 B2
(45) Date of Patent: Mar. 3, 2009

(54) COOLING OF STATOR WINDINGS

(76) Inventor: Dantam K. Rao, 2212 Lynnwood Dr., Schenectady, NY (US) 12309

( * ) Notice: Subject to any disclaimer, the term of this patent is extended or adjusted under 35 U.S.C. 154(b) by 458 days.

(21) Appl. No.: 11/277,900

(22) Filed: Mar. 29, 2006

(65) Prior Publication Data

US 2007/0228846 A1    Oct. 4, 2007

(51) Int. Cl.
*H02K 17/00* (2006.01)
(52) U.S. Cl. .................. 310/201; 310/214; 310/215
(58) Field of Classification Search .............. 310/43, 310/45, 179, 201, 208, 214–215
See application file for complete search history.

(56) References Cited

U.S. PATENT DOCUMENTS

| | | | |
|---|---|---|---|
| 2,858,462 A * | 10/1958 | Knaus | 310/214 |
| 3,965,378 A | 6/1976 | Liebe et al. | |
| 4,282,450 A | 8/1981 | Eckels | |
| 4,484,097 A * | 11/1984 | Kanayama et al. | 310/268 |
| 4,562,164 A * | 12/1985 | Miyazaki et al. | 501/151 |
| 4,853,577 A | 8/1989 | Holly, III | |
| 4,900,956 A | 2/1990 | Gavilondo et al. | |
| 5,091,666 A | 2/1992 | Jarczynski | |
| 5,682,074 A | 10/1997 | Di Pietro et al. | |
| 5,864,193 A * | 1/1999 | Katoh | 310/214 |
| 5,886,434 A | 3/1999 | Nygard | |
| 6,057,624 A * | 5/2000 | Ohtake et al. | 310/214 |
| 6,744,158 B2 | 6/2004 | Liang et al. | |
| 6,777,835 B1 | 8/2004 | Sines | |
| 6,798,105 B1 | 9/2004 | Nilson | |
| 7,096,566 B2 * | 8/2006 | Du et al. | 29/596 |
| 7,119,644 B2 * | 10/2006 | Snitchler et al. | 335/216 |

* cited by examiner

*Primary Examiner*—Thanh Lam
(74) *Attorney, Agent, or Firm*—Clyde I. Coughenour

(57) ABSTRACT

An arrangement for cooling an electric motor's stator winding coil is described. One area of a conductor insulation is removed to expose the copper conductor. The conductor is wound into a coil with bared, exposed conductor areas facing inward. The vertical edges of a slot or recess in an iron stator are lined with electrically insulating paper. A thermally conductive electrically insulating, ceramic substrate is bonded to the floor or base of the slot. The coil is inserted within the slot over the ceramic substrate with the exposed conductor facing and contacting the ceramic substrate. The coil is bonded to the ceramic substrate by thermally conductive and electrically insulative epoxy that fills the voids between the two. Heat flows from the conductor, through the bared copper surface, into the ceramic and the iron core stator with little resistance. A ceramic strip can be used alone or with copper traces bonded to the ceramic or conductor bared surface. Using a thermally conductive epoxy bond reduces resistance due to epoxy smear and reduces thermal resistance of the heat transfer path.

9 Claims, 4 Drawing Sheets

COOLING OF STATOR WINDINGS

BACKGROUND OF THE INVENTION

1. Field of the Invention

The invention is to cooling a coil by shaving off the insulation from an area on the conductor and contacting the bared conductor area with a thermally conductive electrically insulative ceramic to transfer heat away from the conductor and coil.

2. Description of Related Art

Large power motors generate proportionally large amounts of heat. Their conductors, usually copper, are insulated by thin electrically insulating coatings or tape. These coatings, while effective as electrical insulators, unfortunately are also thermally insulative, and obstruct free flow of heat out of the conductors. As a result, the conductors used in the prior art motors see a large rise in temperature. The situation is worsened further when the coil is made by packing a large number of conductors inside a coil window or iron slot. The conductors remote from the cooler window boundaries (those near the center of the coil window) are hotter than those close to the wall of the window. Such hotter conductors are referred to as hot spots.

Hot spot conductors are the first to fail because of thermal degradation of insulation. If the hot spot temperature exceeds the temperature rating of the insulation, it will start failing. The power rating of the motor is limited to ensure that the hot spot temperature never exceeds the thermal rating of the insulation coating. Methods that can reduce hot spots are needed in order to achieve higher power density and longer coil life. These methods are broadly grouped into those that reduce dissipated power and those that reduce thermal resistance.

In the prior art, several methods are used to reduce thermal resistance. These methods include the use of thinner material to reduce thermal gap, more thermally conductive materials that reduce thermal resistance, extended surfaces to increase heat transfer area, using thermally conductive potting compound, eliminating air voids by vacuum pressure impregnation, etc.

E. Sines (U.S. Pat. No. 6,777,835, issued Aug. 17, 2004) proposed inserting an electrically and thermally conductive strip between conductors such as a pitch-graphite composite strip. Its thermal conductivity is so high that it can redirect the heat along its narrow section. Its thermal conductivity is ~600 w/mK which allows heat to flow in a thinner section without increasing resistance. However, this material is electrically conductive, and had to be covered by two electrically insulating layers. The heat has to overcome the resistance of the insulation layers. Thus, even though pitch composite has high thermal conductivity, its insulation layer will obstruct heat flow, increasing thermal resistance.

E. Jarczynski (U.S. Pat. No. 5,091,666, issued Feb. 25, 1992) proposed inserting bare copper strips between laminations to reduce the temperature rise in iron laminations. Such copper strips however are in the path of alternating fields and hence generate eddy losses.

Liebe et al (U.S. Pat. No. 3,965,378) proposed inserting bare copper strips that protrude out of the coil; cool air grazes over it to remove heat by free convection. However, it is well known that the boundary layer of free convective air is about 0.2 in. thick. Packing of copper protrusions at less than 0.25 in. spacing, as proposed by Liebe, will degrade cooling effectiveness.

Liang et al (U.S. Pat. No. 6,744,158, issued Jun. 1, 2004) teaches using conducting rings around the coils for cooling. T. Nilson (U.S. Pat. No. 6,798,105, issued Sep. 28, 2004) teaches insulated winding wires in contact with a cooling medium. R. Nygard (U.S. Pat. No. 5,886,434, issued Mar. 23, 1999) and P. Eckels (U.S. Pat. No. 4,282,450, issued Aug. 4, 1981) are examples of fluid cooling of electrical windings.

SUMMARY OF THE INVENTION

The invention relates to high power electric motors, particularly to cooling stator coils. Of special interest is reducing hot spots within coils. The intent is to increase the power density of the motor by reducing its operating temperature.

To reduce the temperature of stator coils, one side of the coil conductor has the insulation removed exposing the bare copper. The conductor insulation insulates against both electric and heat transfer. By removing the insulation from the conductor and placing the conductor wire in contact with a material that easily conducts heat but acts as an insulation to the flow of electricity, the temperature of the stator coils can be reduced. A thermally conductive ceramic substrate such as alumina or aluminum nitride or beryllium oxide and a thermal epoxy can be used to contact and position the stator coil in place.

The combined effect of bared copper, thermally conductive ceramic substrate and thermal epoxy without smear reduces the hot spot temperature. A cooler coil in turn allows significant reduction in the weight of the motor and increases the power density.

DESCRIPTION OF THE PREFERRED EMBODIMENTS

A central theme of this invention is to present a novel configuration that meets the goal of reducing hot spot temperatures.

Figure 1:
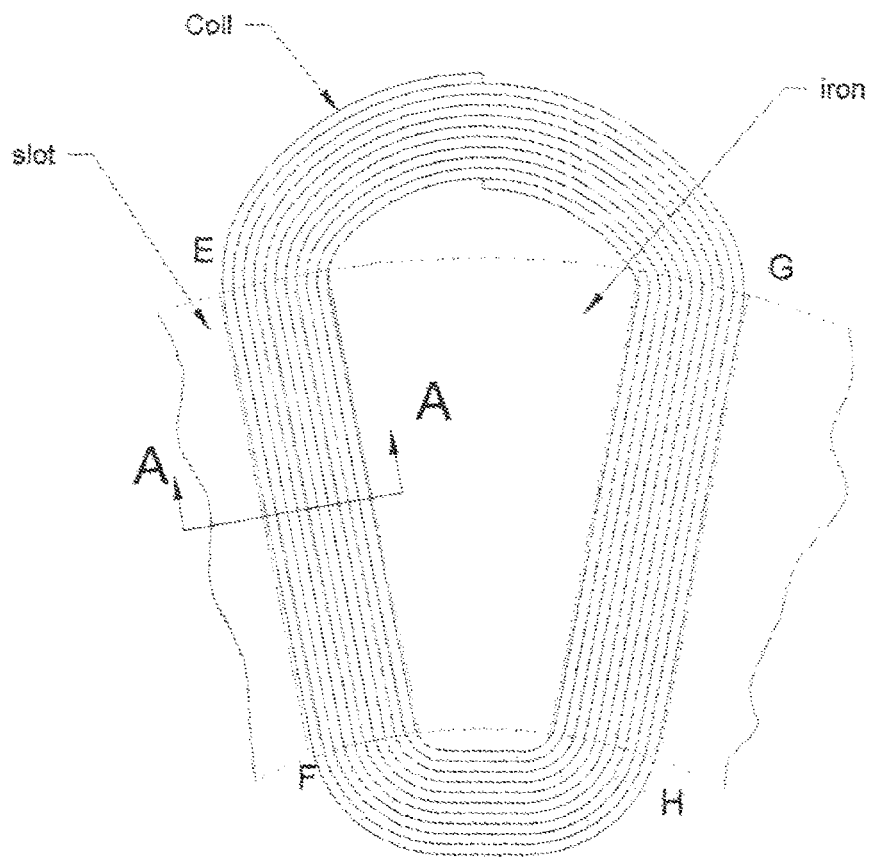
FIG. 1 is a plan view of a prior art coil in a slot of an iron stator of a motor.

FIG. 1 shows a plan view of a prior art coil that lies within a slot of an iron stator of an axial gap motor. Each turn is made of two straight segments EF and GH and two round segments EG and FH, called end windings. The straight segments EF and GH sit within a slot in the iron stator, while end windings EG and FH sit outside of or beyond the iron stator.

Figure 2:
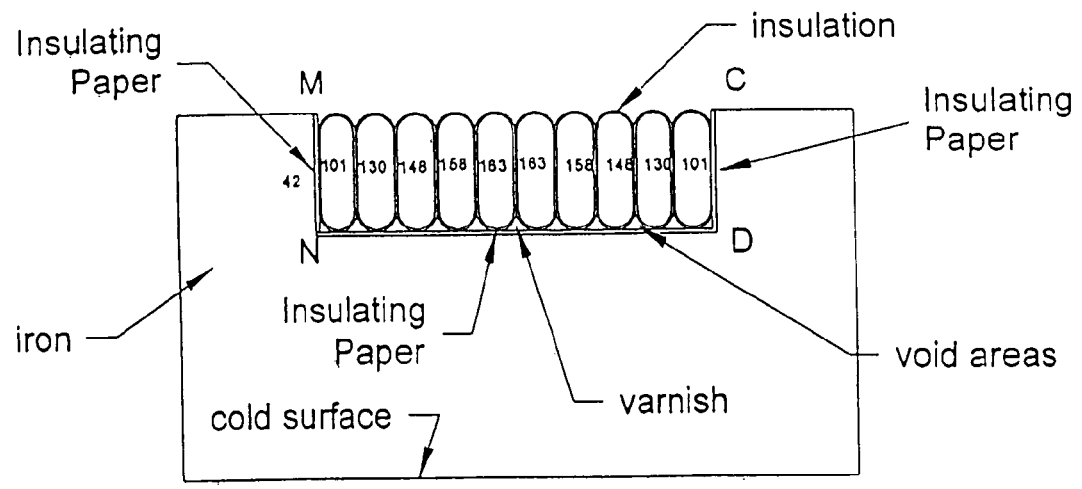
FIG. 2 is a sectional view of the prior art stator assembly along section lines A-A of FIG. 1 and also indicating the temperatures of conductors.

FIG. 2 is a cross-section along the section line A-A of FIG. 1 showing the coil within the slot of an iron core. The slots are lined by an insulating paper such as NOMEX®, and the void areas not occupied by the coil wires are filled with varnish. Also shown are temperatures of various conductors when heat is removed by a cold surface at the bottom. The slot itself has three edges, two vertical and one horizontal; the top may be opened to air. The two vertical edges MN and CD are lined with thin insulation paper, such as NOMEX® Another insulation paper is attached to the bottom horizontal floor (or base) of the slot. The insulation can be made of 3 separate strips, one for MN, one for ND and a third for DC. Alternatively, it can be made of a single paper covering MNDC that is bent at 90 degrees in two places, the stator corners. Once the slot is lined as described, the coil is inserted into it. In this prior art construction, the heat produced by current flow through the copper has great difficulty in traveling to a cooler face of the iron core because it encounters three heat barriers—insulation coating on the conductor, the varnish between the conductors and the insulation paper. They all obstruct the flow of heat. Traditionally a hot spot exists at the center of the windings as they are remote from any cooling or cold surface. The problem to be overcome is developing a structure that cools the hot spot.

As shown in FIG. 2 the conductor is made of rectangular copper wire whose surface is not bared. The coil is made with a conductor and inserted into the slot that is lined with insulation paper, and the void (or picket fence) space is filled with varnish. The rectangular conductor shown has two flat faces and two rounded surfaces. The conductor is covered by thin insulation coating that obstructs heat flow. When the coil is made like a spiral, the conductor insulation overlaps on the flat face, and this overlapping of insulation doubles the resistance to heat flow, and this prevents heat flow in the horizontal direction. The poor thermal conductivity of the insulation, and round edge shape produce high thermal resistance. Shown in this figure is the temperature of conductors obtained by finite element simulation. This indicates that the hot spot temperature is 163° C. at the center.

As an example, consider the prior art FIG. 2 where the coil made of 10 turns of 0.045 in. thick and 0.150 in. wide rectangular conductor insulated by a 0.003 in. wall of coating, with slots lined by 0.005 in. thick NOMEX® paper. The conductor has rounded edges and the space between the round edge and flat NOMEX® paper is filled with a varnish which is vacuum pressure impregnated to remove air. The conductor carries 150 A, producing 2.4 w of heat per inch length and the thermal ground of the bottom surface of the iron core is kept cool at 25° C. Finite element analysis of such prior-art configuration determined that the hot spot will be 163° C. at the central conductor, while the bottom of the NOMEX® sheet is as cool as 40° C. This is because of high thermal resistance offered by the coating, varnish and insulation paper. They act as heat barriers and prevent heat flow. This hot spot temperature is too high.

FIG. 2 also displays the "picket fence" effect. The picket fence is a series of triangular spaces made by the round edge of the conductor and the flat face of the paper. Normally this space is filled with varnish. Heat flows through the insulation coating vertically down and through this varnish towards thermal ground. The resistance of this path is the sum of two resistances, the coating resistance $R_{coat}$ and thermal epoxy resistance $R_{epoxy}$. Consider the preceding example with a 0.150×0.045 in. conductor having a 0.003 in. coating. The coating (L=0.003, k=0.3 w/mK, A=0.070 in.×1 in.) produces resistance of $R_{coat}$=5.62 C/w. Assume that the void or picket fence is filled in a first instance with traditional varnish which offers 0.3 w/mK. The thickness of the varnish within the picket fence varies widely, from 0.022 in. along the left edge, to 0 in. at the center, to 0.022 in. at the right edge. The area the varnish occupies also varies up to 0.045 sq. in. Assume average values for the thickness and area, [L=0.011, k=0.3 w/mK, A=0.045 sq. in.], the resistance of varnish in the picket fence is a large $R_{varnish}$=32 C/w. It is so large compared to the coating's resistance that very little heat will flow through it. For example, if the conductor produces 2.39 watt, the 37.62 C/w resistance of the coating plus varnish yields a temperature rise of 90 C. This is unacceptably large. On the other hand, if this picket fence is filled with a thermally conductive epoxy with a thermal conductivity of say 4 w/mK, its resistance reduces to $R_{epoxy}$=2.4 C/w. This is comparable to that of the insulation coating's 5.62 C/w. If the void or picket fence is filled with this epoxy, the path's thermal resistance is 8 C/w. If 2.39 w is produced by the conductor, then the temperature rise will be only 19° C. Thus it is clear that there is a need to fill the picket fence with thermally conductive epoxy.

The hot spot temperature or junction is denoted by $T_j$. The heat flows from the hot spot to the closest cool area along the path of least resistance. This is usually a surface over which coolant flows, and is usually referred to as a thermal ground, denoted by the symbol c. This temperature is denoted by $T_c$. The temperature of the hot spot is governed by the rms current $I_{rms}$, equivalent series resistance $R_{esr}$, and the conductive thermal resistance $R_{jc}$ between the hot spot j and the ground c. Its temperature can be reduced by reducing one or all of 3 parameters.

Figure 3:
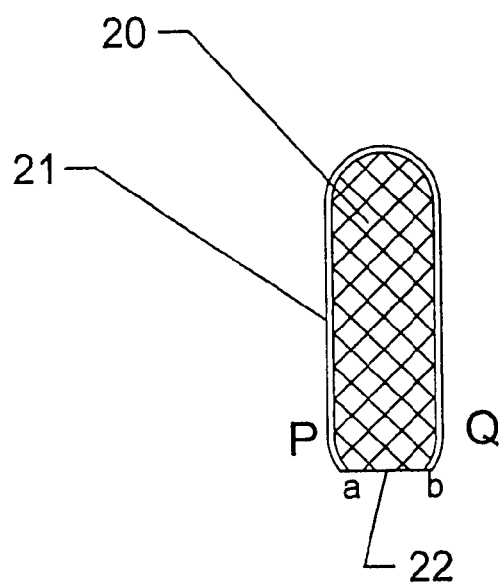
FIG. 3 is a cross-sectional view of a conductor with one edge bared to expose copper.

FIG. 3 shows the cross-section of a bared conductor 20. The conductor 20 starts rounding off the edge at section PQ. It is coated with an electrically insulative coating 21 which also prevents heat flow. At the bottom, rounded edge PQ is partially shaved off 22 to expose a bare copper surface section ab that is flat. This flat surface ab forms a thermal contact area for a flat ceramic substrate. This allows heat to flow without any thermal barrier, such as the insulative coating found on magnet wire.

Figure 4:
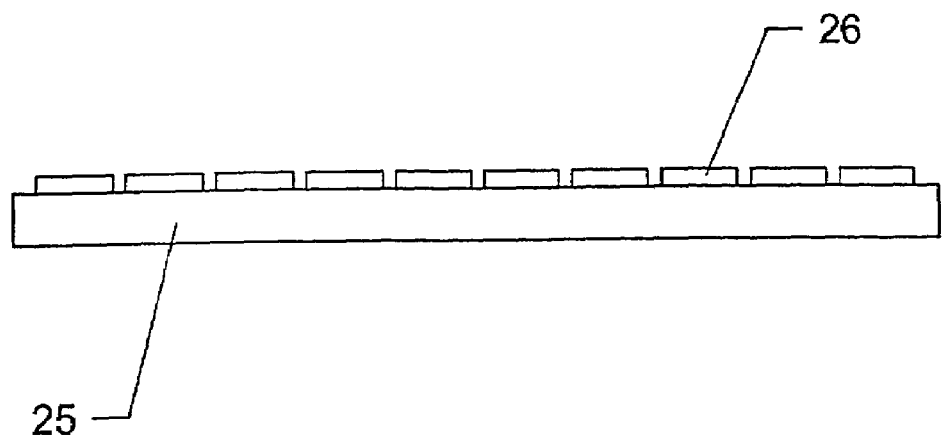
FIG. 4 is a thermally conductive ceramic substrate with direct bonded copper traces.

FIG. 4 shows the structure of a typical thermally conductive and electrically insulative substrate 25. It is made of ceramic materials such as Alumina, BeO or Aluminum Nitride. A simple rectangular strip can be used. It fits within the floor or base of the stator slot. The substrate may also be provided with direct bonded traces 26. If traces are provided, they can be bonded to the bared copper surfaces of the conductor. High conductivity materials such as solder or electrically conductive epoxies can be used to bond traces and conductors to reduce thermal resistance.

To cool end windings, two ceramic strips can be glued to the active conductor portions and two more rectangular strips can be glued to the end winding portions. Heat is transferred by providing a thermal ground at the bottom of the ceramic insulators. Another alternative is a single piece of ceramic substrate, with a shape substantially the same as that of the coil, that is used to cover the entire bottom surface of the coil.

Figure 5:
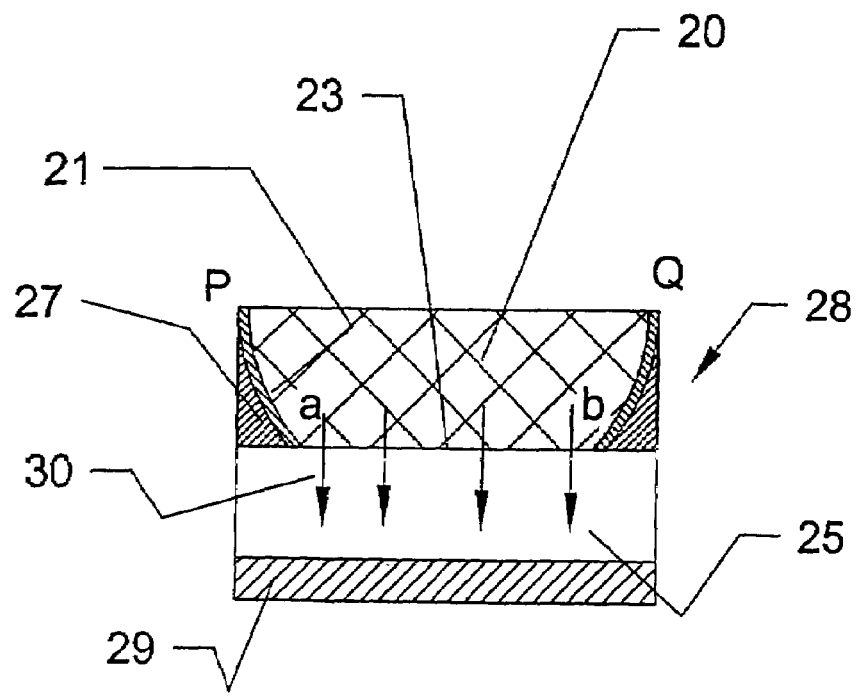
FIG. 5 shows a cross-section of a lower portion of a bared conductor and ceramic substrate with epoxy in void areas to bond the conductor to the substrate.
Figure 6:
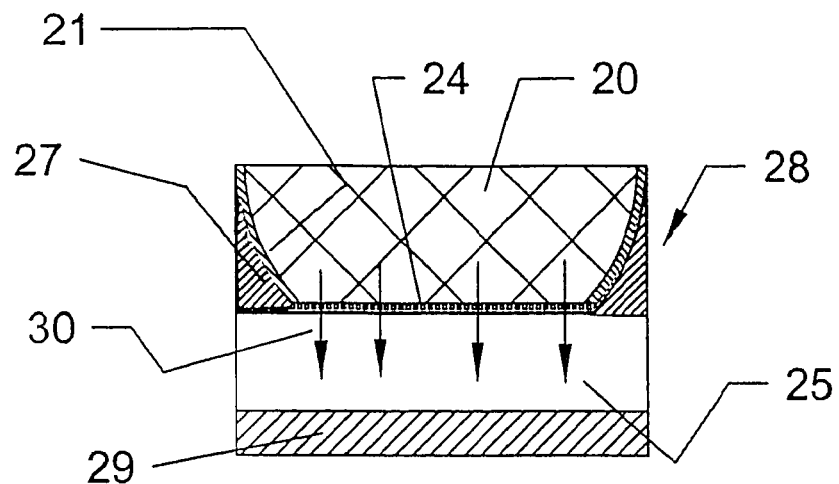
FIG. 6 shows a cross-section of a lower portion of a bared conductor with thermal grease or epoxy interface thermally attaching the copper to a ceramic substrate.

FIGS. 5 and 6 show the arrangement for cooling the conductors. In FIG. 5 the bared conductor 20 is attached to a ceramic substrate 25 by epoxy 27 that resides only in the picket fence or void space 28 defined by the rounded insulation edges a, b and vertical wall of the conductor and horizontal surface of the ceramic substrate. There is no epoxy smear between the copper interface 23 and the ceramic 25 surface between a and b. In this design the heat flows from the bared surface 22 of the conductor 20 directly into ceramic substrate 25 with little or no obstruction. It is assumed that the interface has a good contact and that there are no air pockets between the two. The coil is bonded to the substrate using clamping pressure to increase contact and to decrease thermal resistance. The heat can flow in two paths. The first path is through the copper conductor, across the bared copper surface into the ceramic substrate. The second path is through the copper conductor and then through the curved coating surface 21 into the epoxy 27 in the void or picket fence, and then into to ceramic substrate 25. Because copper is ~1000 times more thermally conductive than epoxy, the resistance of the first path, from the copper to the ceramic substrate, is smaller than that of the second path. As a result, almost all of the heat will flow through the copper ceramic first path.

For example, consider copper 0.150 in. width with 0.010 in. shaved off of the bottom. The bared copper surface is 0.033 in. wide, and is 0.140 in. from the center of the conductor. Assuming a near perfect thermal attachment, this copper to ceramic substrate path offers lowest resistance of $R_{cu}=0.22$ C/w (length L=0.072 in., k=390 w/mK; the bared copper area is A=0.033 in.×1 in.) When the conductor carries 150 A, it generates 2.39 w heat at room temperature. This heat is removed mostly by the first path, so the temperature rise will be 0.53° C. A 0.010 in. thick ceramic substrate, with 25 w/mK and area A=0.045 in.×1 in., on the other hand adds 0.35° C./w, so the net resistance is 0.57° C./w from copper to iron. The 2.39 w of heat then yields 1.4° C. rise from the hot spot to the bottom of the substrate. Baring the conductor and attaching the bared surface to a ceramic substrate reduces the temperature rise of 90° C. to 1.4° C. This essentially amounts to the elimination of the hot spot.

FIG. 6 shows an alternate arrangement for reducing hot spot temperatures. In this embodiment, a thin smear 24 of epoxy exists between the bared conductor surface 22 and the ceramic substrate 25. Even a thin smear or bond line is found to obstruct flow significantly. For example, if one uses a thermally poor epoxy with k=0.3 w/mK, even a 1 mil epoxy smear, increases the hot spot temperature increases by 15° C. It has been found that such a sharp increase in temperature can be offset by using thermally conductive epoxy with k=4 w/mK within the voids or picket fence instead of a thermally poor epoxy. Alternately, any thermal interface material, such as epoxy, phase change material, thermal grease, etc., can also be used, as long as its heat conductivity is very high.

Figure 7:
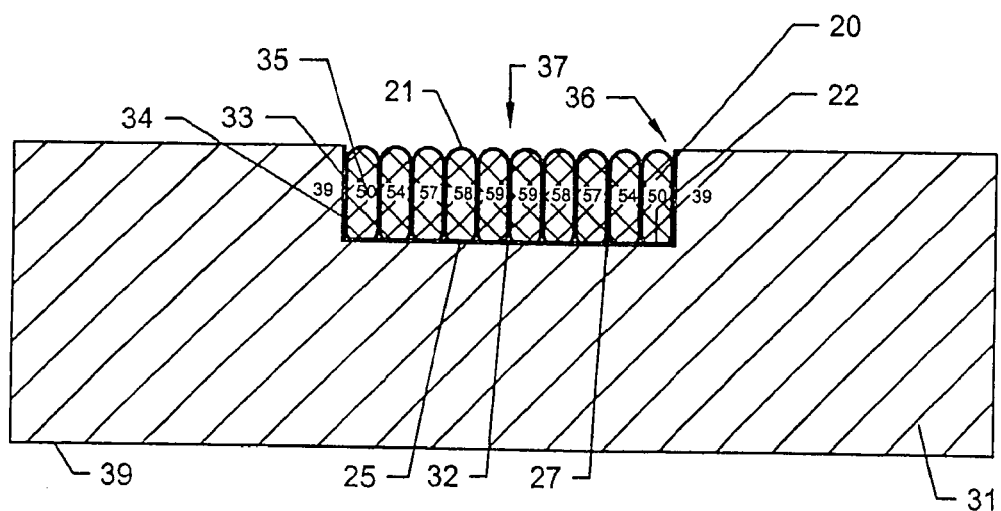
FIG. 7 is a cross sectional view of a stator assembly with bared conductor and indicates the temperatures of conductors.

FIG. 7 is a cross-section of the stator assembly that employs these concepts. The heat is produced by current flow through the copper. The heat transfer is provided between the bared copper 20 and the ceramic substrate 25. The electrical insulation is provided by the coating 21 on the wire, the ceramic substrate and the electrically insulative paper 33 on the iron sidewall such as NOMEX®. Bonding is accomplished by a structural epoxy 27 within the void or picket fence space 28 between the conductors.

The coil is made of a conductor 20 bared at one edge 22. A thermally conductive ceramic substrate 25 is inserted onto the floor or base 32 of the slot 36 and bonded to the iron with a thermally conductive epoxy 27. The side walls of the slot are lined with conventional electrically insulative paper 33. The coil 37 is inserted into the slot and clamped to the ceramic substrate 25 and iron stator 31 and bonded in place by a thermally conductive epoxy 27. This epoxy fills the voids, but does not flow into the interface between the bared copper surface 22 and the ceramic 25 surface. The bottom flat surface 39 of the stator is used as the thermal ground. The heat flows vertically down towards the thermal ground from the copper conductor into the ceramic substrate into the iron and thence to ground. The main elements in this path are copper, ceramic and iron, and they offer little resistance to heat flow. As a result the hot spot temperature in the coil is greatly reduced.

As in the configuration shown in FIG. 2 from the prior art, FIG. 7 shows temperatures in various conductors for the invention. This figure illustrates that when 150 A is flowing through the conductors, the central conductor is only 59° C. This is far cooler than the prior art configuration that produced a hot spot temperature of 163° C., a 63% reduction in temperature. This 63% reduction in temperature greatly aids increasing the power density of the motor. This figure also illustrates that the insulated 33 side walls 34 of the slot have a steep temperature gradient. The reason is that heat traveling along the horizontal heat path, from the central hot spot to extreme right or left ends, encounter a large number of heat transfer retarding coatings 21 before entering the iron stator 31. Because their combined resistance is high, very little heat will flow in this horizontal direction. In fact, the analysis indicates that replacing the vertical NOMEX® slot liner with thermally conductive alumina has no significant effect on the hot spot temperature, i.e. adding a low resistance end liner 34 to a high resistance insulation 21 still results in a high thermal resistance.

There is a sharp temperature gradient from one conductor to the other. The thicker the insulation, the greater the temperature gradient. The gradient is highest at the edge conductor as it is subject to the cumulative thermal resistance of all the coatings.

The air around the conductors on the open top is relatively hot. A permanent magnet rotating close to the conductors will get hot because it is within this high temperature zone produced by the coil. There is a need to protect the magnets from these hot conductor temperatures. As the top surface of the conductor coils is not provided with any thermal protection, the result is that heat radiates into the surrounding air and into the magnets of the rotor. This invention significantly reduces heat radiation resulting in cooler magnets on the rotor.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A coil cooling arrangement comprising:
an electrical coil having electrical conducting wire with an insulating covering;
an open area extending through said insulating cover exposing a portion of said conducting wire while said insulating cover insulates one conductor wire of said coil from another conductor wire;
a support having an inner support surface and an outer surface;
said electrical coil supported by said support inner support surface;
an electrical insulator and thermal conductor substrate extending between said inner support surface and said electrical coil electrical conducting wire to said support inner support surface;
said exposed portion of said conducting wire is in contact with said substrate to permit heat to pass from said electrical coil to said support surface.

2. A coil cooling arrangement as in claim 1 wherein:
said electrical conducting wire is in the general shape of a rectangle with rounded corners.

3. A coil cooling arrangement as in claim 2 wherein:
the voids formed by said rounded corners of said electrical conductor wire adjacent said substrate on said support inner support surface are filled with conductive epoxy.

4. A coil cooling arrangement as in claim 1 wherein:
said substrate on said support inner support surface has conducting traces, that are out of contact with each other, to enhance heat transfer between said coil electrical conductor wire and said support inner support surface.

5. A coil cooling arrangement as in claim 1 wherein:
said support is an iron stator having a slot with a base and side walls for receiving said coil.

6. A coil cooling arrangement as in claim 5 wherein:
said iron stator slot base is provided with said electrical insulator and thermal conductor substrate;
said stator slot side walls are provided with an electrical insulation material.

7. A coil cooling arrangement as in claim 6 wherein:
said substrate is a ceramic and said electrical insulating material in said stator slot side walls is an insulating paper.

8. A coil cooling arrangement as in claim 5 wherein:
said substrate has an inside surface facing said coil and an outside surface facing said support inner support surface;
a thermally conductive epoxy coating extends between said substrate inside surface and said coil.

9. A coil cooling arrangement as in claim 8 wherein:
a thermally conductive epoxy coating extends over said support outer surface.

* * * * *